3,113,122
DYEABLE FIBER-FORMING COMPOSITIONS OF AN ACRYLONITRILE-CONTAINING POLYMER AND A CYANOETHYL ACRYLATE ESTER/ ALKYL ACRYLATE ESTER COPOLYMER
Edward M. La Combe and Paul D. Berry, Charleston, W. Va., assignors to Union Carbide Corporation, a corporation of New York
No Drawing. Filed Apr. 12, 1960, Ser. No. 21,612
9 Claims. (Cl. 260—45.5)

This invention relates to new and valuable fiber-forming compositions. More particularly it is concerned with acrylonitrile polymer compositions capable of being dyed by the conventional procedures.

It is well known that polyacrylonitrile and copolymers of acrylonitrile with one or more other monoolefinic polymerizable monomers are excellent fiber-forming polymers. These polymers have excellent tensile properties, desirable elongation, and excellent stability under a wide range of chemical and physical conditions. However, their ability to be dyed with disperse and acid dyes leaves something to be desired and most often the fibers do not have sufficient dye affinity to enable dyeing by the conventional dyeing techniques; and in many instances the dyes so applied are not light fast or stable to laundering and dry cleaning procedures.

The most frequently proposed solution to improving the dyeability of acrylonitrile-containing fibers with disperse and acid dyes has been that of incorporating a basic monomer, such as methyl vinyl pyridine. Such monomers do improve the dye receptivity of the fibers substantially; however, they also cause other undesirable effects. For example, the color stability at elevated temperatures is seriously impaired, as is the light stability of the dyed fabric.

It has now been found that acrylonitrile polymers can be rendered dye-receptive in the above manner by incorporating with them a minor amount of a copolymer of a cyanoethyl acrylate ester with an alkyl acrylate ester. As used herein, an acrylonitrile polymer is a polymer containing at least about 35% by weight of acrylonitrile and not more than about 65% by weight of at least one other polymerizable monoolefinic monomer copolymerizable therewith. Fibers produced from such polymers have been given the generic names of acrylic and modacrylic fibers by the Federal Trade Commission, under the provisions of the Textile Fiber Products Identification Act enacted by Congress on September 2, 1958. Thus, there is included in this definition homopolymers of acrylonitrile, copolymers, terpolymers, etc. The acrylonitrile polymers are produced by procedures which are well known to the art; and many of said polymers are commercially available.

The modifying copolymers incorporated with the acrylonitrile polymer are the copolymers of a cyanoethyl acrylate ester represented by the general formula:

with an alkyl acrylate ester represented by the general formula:

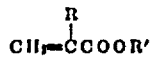

wherein R represents a hydrogen atom or a methyl radical, and R' represents an alkyl radical containing from 1 to about 12 carbon atoms. The preferred cyanoethyl acrylate ester/alkyl acrylate ester contain from about 60% to about 95% by weight of the cyanoethyl acrylate ester and from about 5% to about 40% by weight of the alkyl acrylate ester in the copolymer molecule. Broadly from about 3% to 30% by weight, and preferably from about 5% to about 20% by weight, of said copolymer is effectively employed in preparing the valuable dyeable, fiber-forming compositions of this invention.

The cyanoethyl acrylate esters suitable for use in the production of the modifying copolymers are 2-cyanoethyl acrylate and 2-cyanoethylmethacrylate. Suitable alkyl acrylate esters that can be copolymerized with the 2-cyanoethyl acrylate esters are methyl acrylate, ethyl acrylate, ethyl methacrylate, butyl acrylate, t-butyl acrylate, butyl methacrylate, pentyl acrylate, isopentyl methacrylate, pentyl methacrylate, hexyl acrylate, hexyl methacrylate, heptyl acrylate, octyl acrylate, 2-ethylhexyl acrylate, 2-ethylhexyl methacrylate, decyl acrylate, dodecyl acrylate, dodecyl methacrylate, and the like. These modifying copolymers are readily produced by polymerization processes well known in the art, for example, by polymerization of a mixture of the two monomers in an inert organic diluent while in contact with a peroxidic catalyst.

The dyeable, fiber-forming compositions can be prepared by mixing the solid polymers in conventional mixing equipment, such as, dough mixers, roll mixers, Banbury mixers; or by fluxing the solid polymers. The most effective method of mixing, however, involves treatment in the solution state, and accordingly the polymers are dissolved together in suitable inert organic solvents, for example, acetone, acetonitrile, N,N-dimethylformamide, N,N-dimethylacetamide, gamma-butyrolactone, ethylene carbonate, ethylene carbamate, N-methyl-2-pyrrolidone, etc. The solution of the blended compositions of this invention can then be spun into fibers by the conventional wet or dry spinning techniques. After stretching the fibers to orient the molecules and develop the desired tensile properties, and shrinking to improve their thermal properties, the fibers produced with the compositions of this invention can be employed in the many applications in which acrylonitrile fibers are generally employed. During the blending operation other additives such as delusterants, heat and light stabilizers, etc., can be added if desired.

The fibers produced with the acrylonitrile compositions of this invention are readily dyed by conventional dyeing techniques with a wide variety of dyestuffs to produce highly colored fibers of desirable properties. The fibers produced from the compositions of this invention are dyed to deeper shades and absorb more dye from the dyebath than do the fibers prepared from the unmodified acrylonitrile polymers.

The reduced viscosity ($I_R$) of the polymer is a measure of the degree of polymerization and is defined by the equation:

$$I_R = \frac{\frac{\Delta N}{N_0}}{C}$$

wherein $\Delta N$ is the difference between the flow-time of the solution and the flow-time of the solvent, $N_0$ is the flow-time of the solvent, and $C$ is the concentration of the resin in solution expressed in grams per 100 ml. of solution.

Three methods were employed to quantitatively measure the dye absorption values, as set forth below:

PROCEDURE I

Upon completion of the dyeing cycle, the dyed sample was removed from the dyebath and squeezed by hand. The excess liquor squeezed from the dyed cloth was returned to the dyebath and the dyed fabric was scoured in 500 ml. of 99% isopropanol at room temperature to remove adsorbed dyestuff, which is soluble in isopropanol, from the fabric. Then 2 ml. of the dyebath after dyeing of the fabric was diluted with two ml. of 99% isopropanol.

Two ml. of this solution was then diluted to 50 ml. with a 50/50 isopropanol/water solution and the transmission of this final solution was then spectrophotometrically determined using the Model B Beckman spectrophotometer at a wave length of 50 millimicrons. From a predetermined curve of transmission versus concentration of the dyestuff, the actual amount of dyestuff remaining in the dyebath after dyeing was then calculated. The difference between this amount and the original amount of dyestuff present in the dyebath is the amount of dye both absorbed and adsorbed (or exhausted) by the fiber during the dyeing operation. To show the actual improvement in the amount of dye absorbed by the fibers containing the polymeric dye assistants, a 25 ml. sample of the 99% isopropanol scour bath was diluted with 25 ml. of water. The amount of dyestuff in the scour bath was then calculated from the transmission value of this solution plotted out on the transmission versus concentration curve. This amount of dyestuff is the adsorbed dye which when subtracted from the amount of dye actually exhausted from the dye bath leaves the amount of dye absorbed by the fiber. It then follows that $$\frac{A \text{ absorbed dye}}{A \text{ available dye}} \times 100 = \text{percent of the total available dye absorbed by the sample}$$

Then, $$\left(\frac{\text{Percent total dye absorbed by sample}}{\text{Percent total dye absorbed by control}} - 1\right) \times 100$$

is equal to the percent increase in dye absorption due to the inclusion of the cyanoethyl acrylate ester/alkyl acrylate ester polymeric dye assistant in the fiber.

PROCEDURE II

In this procedure, a piece of the dyed and scoured fabric weighing 0.1 gm. is dissolved in 100 cc. of dimethylformamide. The transmission of this solution at 590 millimicrons is measured using the Bausch and Lomb Spectronic 20 spectrophotometer. The amount of dyestuff in this 100 ml. of solution, which is equal to the amount of dyestuff absorbed by the 0.1 gm. sample of fabric, is read directly from the curve of transmission versus concentration of the dyestuff in dimethylformamide. By simple proportion the amount of dyestuff absorbed by the total weight of fabric is calculated. Then, the percent dye absorbed is calculated by the equation, $$\frac{A \text{ amount of dye absorbed}}{A \text{ amount of dye available}} \times 100$$
$$= \text{percent of the total available dye absorbed by the fabric}$$

The percent increase in dye absorption due to the inclusion of the cyanoethyl acrylate ester/alkyl acrylate ester polymeric dye assistant is calculated as follows:

$$\left(\frac{\text{Percent total dye absorbed by sample}}{\text{Percent total dye absorbed by control}} - 1\right) \times 100$$

PROCEDURE III

This procedure is based on the Kubelka-Munk analysis of spectral reflectivity measurements of dye samples wherein the K/S value is a measure of the light absorbed by the sample. The larger the K/S value, the deeper the shade with a K/S of 20 is indicative of a shade approximately twice as deep as a K/S of 10. From this relationship, then the percent increase in dye absorption is calculated as follows:

$$\left(\frac{K/S \text{ for sample}}{K/S \text{ for control}} - 1\right) \times 100$$

A full description of this procedure is to be found in an article by D. B. Judd, Color in Business, Science and Industry, 1952, pp. 314–342.

The following examples further serve to illustrate the invention but are not intended to limit it.

*Example 1*

A copolymer was produced by reacting a mixture of 540 g. of 2-cyanoethyl acrylate, 60 g. of ethyl acrylate, 900 g. of acetonitrile, and 30 ml. of a 25% by weight solution of diacetyl peroxide in dimethyl phthalate at 50° C. for a 7 hour period in a sealed vessel at autogenous pressure. A measured quantity of the cooled reaction mixture was slowly poured into a ten fold excess of methanol to precipitate the copolymer. The copolymer was filtered and dried at 50° C. The weight of this sample indicated that the polymerization was 95% complete, thus 570 g. of the copolymer of 2-cyanoethyl acrylate/ethyl acrylate had been made. Analysis of the copolymer indicated that it contained 91.5% 2-cyanoethyl acrylate; the reduced viscosity was 1.25 as measured at 30° C. from a solution of 0.2 g. of copolymer in 100 ml. of N,N-dimethylformamide. The balance of the copolymer solution was diluted with acetonitrile so that the final solution contained 20% by weight of the 2-cyanoethyl acrylate/ethyl acrylate copolymer.

Two hundred grams of the above copolymer solution, containing 40 g. of the copolymer, was added to and dissolved in 1060 g. of acetonitrile at room temperature. Then 360 g. of a terpolymer resin containing about 70% by weight of acrylonitrile, about 20% by weight of vinyl chloride, and about 10% by weight of vinylidene chloride (prepared as described in U.S. 2,868,756), and 16 g. of a 50/50 mixture of dioctyl tin maleate and 2-(2-ethylhexyloxy)-5-ethyl-2-oxo-4-propyl-1,3,2-dioxaphosphorinane as heat and light stabilizer were added and mixed to form a resin slurry. This slurry contained 10% by weight of the 2-cyanoethyl acrylate/ethyl acrylate copolymer, based on the total resin weight. The temperature of the slurry was raised, while agitating, to 80° C. thereby solvating the resin and obtaining a homogenous solution. The mixing vessel was then covered and the solution filtered under pressure and metered to a spinnerette having 100 holes, each 0.1 mm. in diameter. The multifilament yarn was coagulated in a 60° C. aqueous bath containing 10% acetonitrile. The yarn produced from the compositions of this invention was withdrawn from the bath and washed with a dilute aqueous solution of polyethylene glycol, dried, stretched 500% at a temperature of about 165° C., and then annealed at about 215° C. allowing 15.2% relaxation (Yarn I). A control yarn (Yarn II) was spun in a similar manner for comparison purposes from the same terpolymer, containing the same quantities of heat and light stabilizers, but without any 2-cyanoethyl acrylate/ethyl acrylate copolymer present. The properties of the two yarns are summarized below:

| Yarn | I | II |
|---|---|---|
| Tensile strength, g.p.d. (ASTM D-1380-57T) | 3.4 | 2.9 |
| Elongation, percent | 20 | 16 |
| Shrinkage, percent in: | | |
| Boiling water | 3.5 | 1.5 |
| 150° C. Air | 2.5 | 2.0 |
| 250° C. Air | 7.0 | 3.5 |

(A) Samples of knit fabric weighing 13.9 g. prepared from each of the above yarns were dyed in separate dyebaths. The dyeings were made from a boiling 4% (based on the weight of the fabric) Celliton Fast Red GGA dyebath having a liquor to fabric ratio of 30 ml.: 1g. Celliton Fast Red GGA (Prototype 236, Colour Index No. 11210) is a disperse or acetate dyestuff and is made by coupling diazotized p-nitroaniline to N,N-dihydroxyethyl-m-toluidine. After 2 hours at the boil, during which time constant dyebath volume was maintained, the fabric was scoured, rinsed and dried. The knitted yarn fabric prepared from the composition of this invention (Yarn I) was dyed a deep red shade and dye absorption values determined by Procedure I after completion of the dyeing showed that 66.5% of the dye available in the dyebath had been absorbed by the fabric. The control fabric (Yarn II), however, was dyed a light red shade and dye absorption values by Procedure I after completion of the dyeing showed that only 38.9% of the dye available in the dyebath had been absorbed by the fabric. Thus, the dye absorption of the fibers produced from the compositions of this invention was 71% greater than that of the control unmodified fibers.

(B) The same fabrics employed in (A) above were dyed with the acid dyestuff Xylene Milling Blue BL (Colour Index 833). Two dyeing techniques were employed; the first was the conventional dyeing technique, and the second was by the well known cuprous-ion technique wherein cupric ions introduced into the dyebath as cupric sulfate are reduced the cuprous state with any suitable reducing agent, such as, hydroxylammonium sulfate, zinc formaldehyde sulfoxylate, glyoxal, etc., to enhance the dyeability of acrylonitrile containing yarns.

Dyebath 1, used for dyeing the fabrics by the conventional technique, was prepared by conventional procedures and contained the following ingredients, with all materials based on the weight of the fabric:

4% Xylene Milling Blue BL
5% sulfuric acid
30 ml.:1 g. liquor to fabric ratio

Twelve gram samples of fabrics knitted from Yarn I and control Yarn II were dyed as described in section (A) using separate dyebaths of Xylene Milling Blue BL prepared as indicated immediately above. Yarn I was dyed an attractive dark blue shade and dye absorption values determined by Procedure II after completion of the dyeing showed that 20.5% of the dye available had been absorbed by the fabric. Control Yarn II was dyed an unattractive light blue shade and dye absorption values determined by Procedure II after completion of the dyeing showed that only 3.08% of the dye available had been absorbed by the fabric. Thus, the dye absorption of Yarn I was 565% greater than that of control Yarn II.

Dyebath 2, used for dyeing the fabrics by the cuprous-ion technique was prepared by conventional procedures and contained the following ingredients; all materials are based on the weight of the fabric:

4% Xylene Milling Blue BL
2% cupric sulfate
1% hydroxylammonium sulfate
1% sulfuric acid
30 ml.:1 g. liquor to fabric ratio Approximately 13.1 g. samples of fabrics knitted from Yarn I and control Yarn II were dyed as described in section (A) using separate dyebaths of Xylene Milling Blue BL prepared as described immediately above. Yarn I was dyed an attractive deep dark blue shade and dye absorption values determined by Procedure II after completion of the dyeing showed that 82.8% of the dye available had been absorbed by the fabric. Control Yarn II was dyed a light blue shade and dye absorption values determined by Procedure II after completion of the dyeing showed that only 10.5% of the dye available had been absorbed by the fabric. Thus, the dye absorption of Yarn I was 690% greater than that of control Yarn II.

(C) Yarn I and control Yarn II (13.4 g. samples of knit fabric of each) were dyed with the basic cationic dyestuff Victoria Green Small Crystals (Colour Index 657) by the same procedure described in Section (A) above. The dyebath was prepared by conventional procedures and contained the following ingredients, with all materials based on the weight of the fabric:

4% Victoria Green Small Crystals
0.5% acetic acid
30 ml.:1 g. liquor to fabric ratio Yarn I was dyed an attractive dark green shade and dye absorption values determined by Procedure III after completion of the dyeing showed a K/S value of 12.9. Control Yarn II was dyed a light green shade and dye absorption values determined by Procedure III after completion of the dyeing showed a K/S value of 3.4. Thus, the dye absorption of Yarn I was 280% greater than that of control Yarn II.

*Example 2*

A copolymer was produced by reacting a mixture of 279 g. of 2-cyanoethyl acrylate, 21 g. of ethyl acrylate, 450 g. of N,N-dimethylformamide, and 15 ml. of a 25% by weight solution of diacetyl peroxide in dimethyl phthalate at 50° C. for a 6 hour period in a sealed vessel at autogenous pressure. A measured quantity of the cooled reaction mixture was slowly poured into a large excess of methanol to precipitate the 2-cyanoethyl acrylate/ethyl acrylate copolymer. The copolymer was filtered and dried. The weight of this sample indicated that the polymerization was 91% complete. Analysis of the copolymer showed that it contained 92% 2-cyanoethyl acrylate; the reduced viscosity was 1.20 as measured at 30° C. from a solution of 0.2 g. of copolymer in 100 ml. of N,N-dimethylformamide. The balance of the reaction mixture was slowly poured into a large excess of methanol to precipitate the 2-cyanoethyl acrylate/ethyl acrylate copolymer, which was filtered, dried, and then dissolved in N,N-dimethylformamide to make a solution containing 25.7% by weight of the copolymer.

A 116.7 g. portion of the above copolymer solution, containing 30 g. of the copolymer, was added to and dissolved in 513 g. of N,N-dimethylformamide. The solution was chilled to 0° C. and 120 g. of polyacrylonitrile, having a reduced viscosity of 1.90 as measured at 30° C. from a solution of 0.2 g. of polyacrylonitrile per 100 ml. of N,N-dimethylformamide, was added and mixed to form a slurry. Three grams of dioctyl tin maleate was added as heat and light stabilizer. The slurry contained 20% by weight of the 2-cyanoethyl acrylate/ethyl acrylate copolymer, based on the total resin weight. The temperature of the slurry was raised, while agitating, to 80° C. thereby solvating the resin and obtaining a homogeneous solution. The solution was extruded through a spinnerette as described in Example 1. The extruded multifilament yarn was coagulated in a 90° C. dipropylene glycol bath. The yarn produced from the composition of this invention was withdrawn from the bath, washed in 80° C. water, and wound onto a bobbin. Two ends of the yarn were stretched together to the extent of 700% to produce a 200 filament, 240 denier yarn by passing through a steam stretching tube at about 117° C., twisted, continuously annealed at 200° C. allowing 15% relaxation, and wound into a package (Yarn III). A control yarn (Yarn IV) was spun in a similar manner from the same polyacrylonitrile but without any 2-cyanoethyl acrylate/ethyl acrylate copolymer present. The properties of the two yarns are summarized below:

| Yarn | III | IV |
|---|---|---|
| Tensile strength, g.p.d. | 2.3 | 3.2 |
| Elongation, percent | 15 | 18.5 |
| Shrinkage, percent in: | | |
| Boiling water | 3.0 | 3.0 |
| 150° C. Air | 7.0 | 8.0 |
| 200° C. Air | 12.0 | 16.0 |

Samples of fabric weighing 10.9 g. knit from each of the yarns were dyed as described in Example 1 section (B) using the cuprous-ion technique and a dyebath of the composition of Dyebath 2 of Example 1 section (B). Yarn III was dyed an attractive, deep, dark blue shade and dye absorption values determined by Procedure II after completion of the dyeing showed that 96.6% of the dye available had been absorbed by the fabric. Control Yarn IV was dyed a light blue shade and dye absorption values determined by Procedure II after completion of the dyeing showed that only 19.8% of the dye available had been absorbed by the fabric. Thus the dye absorption of Yarn III was 387% greater than that of Yarn IV.

*Example 3*

A copolymer was produced as described in Example 2 by reacting a mixture of 180 g. of 2-cyanoethyl acrylate, 120 g. of ethyl acrylate, 450 g. of acetonitrile, and 15 ml. of a 25% by weight solution of diacetyl peroxide in dimethyl phthalate. The 2-cyanoethyl acrylate/ethyl acrylate copolymer had a 61% 2-cyanoethyl acrylate content, and a reduced viscosity of 1.90 at 30° C. from a solution of 0.2 g. of copolymer in 100 ml. of N,N-dimethylformamide. The reaction mixture was diluted with additional acetonitrile to make a solution containing 19.4% by weight of the copolymer.

A 38.3 g. portion of the above copolymer solution, containing 7.5 g. of the copolymer, was added to and dissolved in 419.2 g. of acetone. The solution was chilled to about 0° C. and 142.5 g. of a copolymer of about 60% vinyl chloride and about 40% acrylonitrile having a reduced viscosity of 1.30 as measured at 30° C. from a solution of 0.2 g. of said copolymer per 100 ml. of N,N-dimethylformamide was added and mixed to form a slurry. Three grams of dioctyl tin maleate was added as heat and light stabilizer. The slurry contained 5% by weight of the 2-cyanoethyl acrylate/ethyl acrylate copolymer, based on the total resin weight. The temperature of the slurry was raised, while agitating, to 60° C. to obtain a homogeneous solution. The solution was extruded through a spinnerette as described in Example 1. The extruded multifilament yarn was coagulated in a 50° C. aqueous bath containing 15% acetone. The yarn produced from the composition of this invention was withdrawn from the bath, washed with 80° C. water, wound onto a bobbin, and dried in a 55° C. air oven for several hours. Two ends of the yarn were stretched together to the extent of 1000% to produce a 200 filament, 167 denier yarn by passing through a steam stretching tube at about 117° C., continuously annealed at 140° C. allowing 15% relaxation and wound into a package (Yarn V). A control yarn (Yarn VI) was spun in a similar manner from the same vinyl chloride/acrylonitrile copolymer but without any 2-cyanoethyl acrylate/ethyl acrylate copolymer present. Samples of fabric knit from each of the above yarns were dyed as described in Example 2, and it was observed that Yarn V had a higher dye absorption value than Yarn VI. The properties of the undyed yarns are summarized below:

| Yarn | V | VI |
|---|---|---|
| Tensile strength, g.p.d | 3.4 | 3.1 |
| Elongation, percent | 18.0 | 18.5 |
| Shrinkage in boiling water, percent | 11.0 | 10.5 |

*Example 4*

A copolymer was produced as described in Example 2 by reacting a mixture of 90 g. of 2-cyanoethyl acrylate, 10 g. of methyl methacrylate, 150 g. of acetonitrile, and 5 ml. of a 25% solution of diacetyl peroxide in dimethyl phthalate. Conversion was 97% to a copolymer having a 2-cyanoethyl acrylate content of 87% by weight and a reduced viscosity of 1.32 as measured at 30° C. from a solution of 0.2 g. of copolymer in 100 ml. of N,N-dimethylformamide. The copolymer was isolated and dried.

A 40 g. portion of the above 2-cyanoethyl acrylate/methyl methacrylate copolymer was dissolved in 1200 g. of acetonitrile at room temperature. Then 360 g. of a terpolymer containing about 70% by weight of acrylonitrile, about 20% by weight of vinyl chloride, and about 10% by weight of vinylidene chloride, said terpolymer having a reduced viscosity of 1.72 as measured at 30° C. from a solution of 0.2 g. of terpolymer per 100 ml. of N,N-dimethylformamide, and 16 g. of a 50/50 mixture of dioctyltin maleate and 2-(2-ethylhexyloxy)-5-ethyl-2-oxo-4-propyl-1,3,2-dioxaphosphorinane as heat and light stabilizers were added and mixed to form a slurry. The slurry contained 10% by weight of the 2-cyanoethyl acrylate/methyl methacrylate copolymer, based on the total resin weight. The temperature of the slurry was raised, while agitating, to about 80° C. to solvate the resin. At this point 25 g. of N,N-dimethylformamide was added to assure complete homogeneity in the spinning solution. The solution was spun, as described in Example 1, to produce a 100 filament, 282 denier yarn (Yarn VII). A control yarn (Yarn VIII) was spun in a similar manner from the same terpolymer containing the same heat and light stabilizers but without any 2-cyanoethyl acrylate/methyl methacrylate copolymer present. The properties of the yarns are summarized below:

| Yarn | VII | VIII |
|---|---|---|
| Tensile strength, g.p.d | 3.5 | 3.5 |
| Elongation, percent | 19.0 | 18.8 |
| Shrinkage, percent in: | | |
| Boiling water | 2.0 | 2.0 |
| 150° C. Air | 2.0 | 2.0 |
| 200° C. Air | 0.5 | 5.0 |

Samples of fabric weighing 16.3 g. and knit from each of the yarns were dyed as described in Example 1, section (A). Yarn VII was dyed an attractive deep red shade and dye absorption values determined by Procedure I after completion of the dyeing showed that 63.9% of the dye available had been absorbed by the fabric. Control Yarn VIII was dyed a lighter red shade and dye absorption values determined by Procedure I after completion of the dyeing showed that only 40.8% of the dye available had been absorbed by the fabric. Thus the dye absorption of Yarn VII was 56% greater than that of Yarn VIII.

*Example 5*

A copolymer was produced by reacting a mixture of 90 g. of 2-cyanoethyl acrylate, 10 g. of 2-ethylhexyl acrylate, 250 g. of acetonitrile, 5 ml. of a 25% by weight solution of diacetyl peroxide in dimethyl phthalate, and 0.25 g. of mixed tertiary mercaptans (a mixture of t-dodecyl, t-tetradecyl and t-hexadecyl mercaptans) at 50° C. for 15 hours as described in Example 1. Conversion was 95% to a 2-cyanoethyl acrylate/2-ethylhexyl acrylate copolymer having a 2-cyanoethyl acrylate content of 87% by weight and a reduced viscosity of 1.07 was measured at 30° C. from a solution of 0.2 g. of copolymer in 100 ml. of N,N-dimethylformamide. The copolymer was isolated and dried.

A 50 g. portion of the above copolymer was dissolved in 1500 g. of acetonitrile at room temperature. Then 450 g. of a terpolymer containing about 70% by weight of acrylonitrile, about 20% by weight of vinyl chloride, and about 10% by weight of vinylidene chloride, said terpolymer having a reduced viscosity of 1.30 as measured at 30° C. from a solution of 0.2 g. of terpolymer per 100 ml. of N,N-dimethylformamide, and 16 g. of a 50/50 mixture of dioctyl tin maleate and 2-(2-ethylhexyloxy)-5-ethyl-2-oxo-4 - propyl - 1,3,2 - dioxaphosphorinane were added and mixed to form a slurry. The slurry contained 10% by weight of the 2-cyanoethyl acrylate/2-ethylhexyl acrylate copolymer, based on the total resin weight. The temperature of the slurry was raised, while agitating, to about 80° C. to obtain a homogeneous solution. The solution was spun as described in Example 1 to produce a 100 filament, 298 denier yarn (Yarn IX). A control yarn (Yarn X) was spun in a similar manner from the same terpolymer containing the same stabilizers but without any 2-cyanoethyl acrylate/2-ethylhexyl acrylate copolymer present. The properties of the yarns are summarized below:

| Yarn | IX | X |
|---|---|---|
| Tensile strength, g.p.d | 3.1 | 3.7 |
| Elongation, percent | 21.3 | 20.1 |
| Shrinkage, percent, in: | | |
| Boiling water | 3.0 | 2.0 |
| 150° C. Air | 2.5 | 1.0 |

Samples of fabric weighing 13.5 g. and knit from each of the yarns were dyed as described in Example 1, section (B) using the conventional dyeing procedure and a dyebath similar to Dyebath 1 of Example 1, section (B). Yarn IX was dyed an attractive dark blue shade and dye absorption values as determined by Procedure II after completion of the dyeing showed that 16.8% of the dye available had been absorbed by the fabric. Control Yarn X was dyed a light blue shade and dye absorption values as determined by Procedure II after completion of the dyeing showed that only 1.42% of the dye available had been absorbed by the fabric. Thus the dye absorption of Yarn IX was 1080% greater than that of Yarn X.

*Example 6*

A copolymer was produced by reacting a mixture of 70 g. of 2-cyanoethyl methacrylate, 20 g. of 2-ethylhexyl acrylate, 150 g. of acetonitrile, and 5 ml. of a 25% by weight solution of diacetyl peroxide in dimethyl phthalate at 50° C. for about 21¾ hours as described in Example 1. Conversion was 96% to a 2-cyanoethyl methacrylate/2-ethylhexyl acrylate copolymer having a 2-cyanoethyl methacrylate content of 82% by weight and a reduced viscosity of 0.57 as measured at 30° C. from a solution of 0.2 g. of copolymer in 100 ml. of N,N-dimethylformamide. The copolymer was isolated and dried.

A 40 g. portion of the above copolymer was dissolved in 1200 g. of acetonitrile at room temperature. Then 360 grams of the same terpolymer described in Example 4, and 16 grams of the same 50/50 mixture of heat and light stabilizer described in Example 1 were added. The mixture, which contained 10% by weight of the 2-cyanoethyl methacrylate/2-ethylhexyl acrylate copolymer, based on the total resin weight, was heated to form a homogeneous solution, 20 g. of ethylene carbonate was added, and it was then spun into yarn, as described in Example 1, to a 100 filament, 272 denier yarn (Yarn XI). A control yarn (Yarn XII) was spun in a similar manner from the same terpolymer containing the same stabilizers but without the 2-cyanoethyl methacrylate/2-ethylhexyl acrylate copolymer present. The properties of the yarns are summarized below:

| Yarn | XI | XII |
|---|---|---|
| Tensile strength, g.p.d | 3.0 | 3.5 |
| Elongation, percent | 20.0 | 18.8 |
| Shrinkage, percent, in: | | |
| Boiling water | 3.0 | 2.0 |
| 150° C. Air | 2.0 | 2.0 |
| 200° C. Air | 5.0 | 5.0 |

Samples of fabric weighing 12.5 g. and knit from each of the yarns were dyed as described in Example 1, section (A) using the same dyestuff therein employed. Yarn XI was dyed an attractive deep red shade and dye absorption values as determined by Procedure I after completion of the dyeing showed that 62% of the dye available had been adsorbed by the fabric. Control Yarn XII was dyed a lighter red shade and dye absorption values as determined by Procedure I after completion of the dyeing showed that only 40.8% of the dye available had been absorbed by the fabric. Thus the dye absorption of Yarn XI was 52% greater than that of Yarn XII.

*Example 7*

A copolymer was produced by reacting a mixture of 120 g. of 2-cyanoethyl acrylate, 13.4 g. of 2-ethylhexyl acrylate, 166.8 g. of acetonitrile, and 5.15 g. of a 25% by weight solution of diacetyl peroxide in dimethyl phthalate at 50° C. for about 3¾ hours as described in Example 1. Conversion was about 42% to a 2-cyanoethyl acrylate/2-ethylhexyl acrylate copolymer having a 2-cyanoethyl acrylate content of 89.7% by weight and a reduced viscosity of 2.17 as measured at 30° C. from a solution of 0.2 g. of copolymer in 100 ml. of N,N-dimethylformamide. The copolymer was isolated and dried.

A 40 g. portion of the above copolymer was dissolved in 1200 g. of acetonitrile at room temperature. Then 360 g. of a terpolymer resin of the composition described in Example 4 but having a reduced viscosity of 1.55 at 30° C. from a solution of 0.2 g. of terpolymer per 100 ml. of N,N-dimethylformamide, and 16 g. of the same heat and light stabilizers were added to the solution. The mixture, which contained 10% by weight of the 2-cyanoethyl acrylate/2-ethylhexyl acrylate copolymer, based on the total resin weight, was heated to 80° C. to form a homogeneous solution and it was then spun into yarn, as described in Example 1, to produce a 100 filament, 257 denier yarn (Yarn XIII). A control yarn (Yarn XIV) was spun in a similar manner from the same terpolymer containing the same stabilizers but without the 2-cyanoethyl acrylate/2-ethylhexyl acrylate copolymer present. The properties of the yarns are summarized below:

| Yarn | XIII | XIV |
|---|---|---|
| Tensile strength, g.p.d | 3.4 | 3.4 |
| Elongation, percent | 19.8 | 20.0 |
| Shrinkage, percent, in: | | |
| Boiling water | 3.0 | 2.5 |
| 150° C. Air | 3.0 | 2.0 |
| 200° C. Air | 5.5 | 5.0 |

Samples of fabric weighing 15.5 g. and knit from each of the yarns were dyed from a boiling 4% (based on the weight of the fabric) Xylene Milling Blue BL (Colour Index 833) dyebath of liquor to fabric ratio 30 ml.:1 g. The dyebath contained, in addition to the dyestuff and water, 1.5% of the cationic condensation product of ethylene glycol and an organic amine, i.e., a methyl polyethanol quaternary amine which is marketed under the trade name "Peregal OK" as a leveling agent, 3.8% of sodium p-phenylphenoxide, 2.5% of sulfuric acid, 0.75% of cupric sulfate and 0.3% of zinc formaldehyde sulfoxylate. Yarn XIII was dyed a dark attractive blue shade; and dye absorption values as determined by Procedure II after completion of the dyeing showed that 49.4% of the dye available had been absorbed by the fabric. Control Yarn XIV was dyed a light blue shade; and dye absorption values as determined by Procedure II after completion of the dyeing showed that 19.6% of the dye available had been absorbed by the fabric. Thus the dye absorption of Yarn XIII was 152% greater than that of Yarn XIV.

*Example 8*

A copolymer was produced by reacting a mixture of 270 g. of 2-cyanoethyl acrylate, 30 g. of 2-ethylhexyl acrylate, 450 g. of acetonitrile, and 17.6 g. of a 25% by weight solution of diacetyl peroxide in dimethyl phthalate at 50° C. for about 3 hours as described in Example 1. Conversion was 83.6% to a 2-cyanoethyl acrylate/2-ethylhexyl acrylate copolymer having a 2-cyanoethyl acrylate content of 83.6% by weight and a reduced viscosity of 2.26 as measured at 30° C. from a solution of 0.2 g. of copolymer in 100 ml. of N,N-dimethylformamide. The copolymer was isolated and dried.

A 13 g. portion of the above copolymer was dissolved in 625 g. of ethylene carbonate at about 125° C. The solution was cooled to 40° C. and 117 g. of polyacrylonitrile having a reduced viscosity of 1.67 as measured at 30° C. from a solution of 0.2 g. of polyacrylonitrile in 100 ml. of N,N-dimethylformamide, 2.6 g. of dioctyltin maleate as light and heat stabilizer, and 112 g. of distilled water were added. The mixture was heated, while agitating, to 90° C. to produce a clear homogeneous solution and spun. The multifilament yarn was coagulated in a 90° C. dipropylene glycol bath. The yarn was withdrawn from the bath, washed with water, and then leached in water heated to 80° C. for 30 minutes to remove excess solvent from the yarn before drying in an air oven at 60° C. Two ends of the yarn were stretched together to the extent of 1000% by passing through a steam stretching tube at 136° C., twisted, continuously annealed at 190° C. allowing 15% relaxation, and wound into a package. The resulting 200 filament, 249 denier yarn (Yarn XV) contained 10% by weight of the 2-cyanoethyl acrylate/2-ethylhexyl acrylate copolymer. A control yarn (Yarn XVI) was spun from the same polyacrylonitrile containing the same stabilizer but without any 2-cyanoethyl acrylate/2-ethylhexylacrylate copolymer present. The properties of the yarns are summarized below:

| Yarn | XV | XVI |
|---|---|---|
| Tensile strength, g.p.d. | 4.0 | 4.3 |
| Elongation, percent | 14.5 | 17.5 |
| Shrinkage, percent, in: | | |
| Boiling water | 2.0 | 2.0 |
| 150° C. Air | 2.5 | 4.0 |
| 200° C. Air | 4.5 | 5.5 |

Samples of fabric knit from each of the yarns were dyed with Xylene Milling Blue BL as described in Example 7. Yarn XV was dyed an attractive dark blue shade and dye absorption values as determined by Procedure II after completion of the dyeing showed that 37.9% of the dye available had been absorbed by the fabric. Control Yarn XVI was dyed a light blue shade and dye absorption values as determined by Procedure II after completion of the dyeing showed that 16% of the dye available had been absorbed by the fabric. Thus the dye absorption of Yarn XV was 136% greater than that of control Yarn XVI.

*Example 9*

A copolymer was produced by reacting a mixture of 70 g. of 2-cyanoethyl methacrylate, 20 g. of 2-ethylhexyl acrylate, 150 g. of acetonitrile, and 5 ml. of a 25% by weight solution of diacetyl peroxide in dimethyl phthalate at 50° C. for about 21 hours as described in Example I. Conversion was 95% to a 2-cyanoethyl methacrylate/2-ethylhexyl acrylate copolymer having a 2-cyanoethyl methacrylate content of 81.9% by weight and a reduced viscosity of 0.566 as measured at 30° C. from a solution of 0.2 g. of copolymer in 100 ml. of N,N-dimethylformamide. The copolymer was isolated and dried.

A 40 g. portion of the above copolymer was dissolved in 1200 g. of acetonitrile at room temperature. Then 360 g. of terpolymer similar in composition to that used in Example 1 and having a reduced viscosity of 1.72 as measured at 30° C. from a solution of 0.2 g. of terpolymer in 100 ml. of N,N-dimethylformamide, and 16 g. of the heat and light stabilizers used in Example 1 were added. The mixture was heated, while agitating, to produce a clear homogeneous solution, and spun as described in Example 1 to produce a 100 filament, 272 denier yarn (Yarn XVII) containing 10% by weight of the 2-cyanoethyl methacrylate/2-ethyl-hexyl acrylate copolymer. During the spinning a small amount of ethylene carbonate was added to the spinning solution. A control yarn (Yarn XVIII) was spun from the same terpolymer containing the same stabilizers but without any 2-cyanoethyl methacrylate/2-ethylhexyl acrylate copolymer present. The properties of the yarns are summarized below:

| Yarn | XVII | XVIII |
|---|---|---|
| Tensile strength, g.p.d. | 3.0 | 3.5 |
| Elongation, percent | 20.0 | 18.8 |
| Shrinkage, percent, in: | | |
| Boiling water | 3.0 | 2.0 |
| 150° C. Air | 2.0 | 2.0 |
| 200° C. Air | 5.0 | 5.0 |

Samples of fabric weighing 125 g. and knit from each of the yarns were dyed with Celliton Fast Red GGA as described in Example 1, section (A). Yarn XVII was dyed an attractive deep red color and dye absorption values as determined by Procedure I after completion of the dyeing showed that 62% of the dye available had been absorbed by the fabric. Control Yarn XVIII was dyed a medium pink shade and dye absorption values as determined by Procedure I after completion of the dying showed that 40.8% of the dye available had been absorbed by the fabric. Thus the dye absorption of Yarn XVII was 52% greater than that of control Yarn XVIII.

Similar sized samples of each fabric were dyed with Xylene Milling Blue BL by the dyeing method described in Example 1, section (B) using a dyebath similar to Dyebath 1 as described therein. Yarn XVII was dyed an attractive dark blue shade and dye absorption values as determined by Procedure II after completion of the dyeing showed that 13% of the dye available had been absorbed by the fabric. Control Yarn XVIII was dyed a light blue shade and dye absorption values as determined by Procedure II after completion of the dyeing showed that 5.2% of the dye available had been absorbed by the fabric. Thus the dye absorption of Yarn XVII was 150% greater than that of control Yarn XVIII.

What is claimed is:

1. A dyeable fiber-forming composition comprising a blend of (A) from about 80% to 95% by weight of an acrylonitrile polymer having a content of at least about 35% by weight of polymerized acrylonitrile and not more than about 65% by weight of at least one other polymerizable monomer selected from the group consisting of vinyl chloride and vinylidene chloride copolymerized therewith and (B) from about 5% to 20% by weight of a copolymer of a cyanoethyl acrylate ester represented by the general formula:

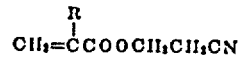

with an alkyl acrylate ester represented by the general formula:

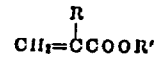

wherein R represents a member selected from the group consisting of a hydrogen atom and a methyl radical, and R' represents an alkyl radical containing from 1 to about 12 carbon atoms; said copolymer containing in the copolymer molecule from about 60% to about 95% by weight of cyanoethyl acrylate ester represented by the general formula:

and from about 5% to about 40% by weight of alkyl acrylate ester represented by the general formula:

2. The composition as claimed in claim 1 wherein the polymer of acrylonitrile (A) is polyacrylonitrile.

3. The composition as claimed in claim 1 wherein the polymer of acrylonitrile (A) is a copolymer containing about 40% by weight of acrylonitrile and about 60% by weight of vinyl chloride.

4. The composition as claimed in claim 1 wherein the polymer of acrylonitrile (A) is a terpolymer containing about 70% by weight of acrylonitrile, about 20% by weight of vinyl chloride, and about 10% by weight of vinylidene chloride.

5. The composition as claimed in claim 1 wherein the copolymer (B) is a copolymer of 2-cyanoethyl acrylate and 2-ethylhexyl acrylate.

6. The composition as claimed in claim 1 wherein the copolymer (B) is a copolymer of 2-cyanoethyl methacrylate and 2-ethylhexyl acrylate.

7. The composition as claimed in claim 1 wherein the copolymer (B) is a copolymer of 2-cyanoethyl acrylate and ethyl acrylate.

8. The composition as claimed in claim 1 wherein the copolymer (B) is a copolymer of 2-cyanoethyl acrylate and methyl methacrylate.

9. A synthetic fiber comprising (A) from about 80% to 95% by weight of an acrylonitrile polymer having a content of at least about 35% by weight of polymerized acrylonitrile and not more than about 65% by weight of at least one other polymerizable monomer selected from the group consisting of vinyl chloride and vinylidene chloride copolymerized therewith and (B) from about 5% to 20% by weight of a copolymer of a cyanoethyl acrylate ester represented by the general formula:

$$CH_2=\overset{R}{\underset{|}{C}}COOCH_2CH_2CN$$

with an alkyl acrylate ester represented by the general formula:

$$CH_2=\overset{R}{\underset{|}{C}}COOR'$$

wherein R represents a member selected from the group consisting of a hydrogen atom and a methyl radical, and R' represents an alkyl radical containing from 1 to about 12 carbon atoms, said copolymer containing in the copolymer molecule from about 60% to about 95% by weight of cyanoethyl acrylate ester represented by the general formula:

$$CH_2=\overset{R}{\underset{|}{C}}COOCH_2CH_2CN$$

and from about 5% to about 40% by weight of alkyl acrylate ester represented by the general formula:

$$CH_2=\overset{R}{\underset{|}{C}}COOR'$$

References Cited in the file of this patent
UNITED STATES PATENTS

| | | |
|---|---|---|
| 2,451,178 | Semegen | Oct. 12, 1948 |
| 2,688,008 | Chaney et al. | Aug. 31, 1954 |
| 2,835,646 | Sell | May 20, 1958 |
| 2,850,478 | Coover et al. | Sept. 2, 1958 |

UNITED STATES PATENT OFFICE
CERTIFICATE OF CORRECTION

Patent No. 3,113,122                            December 3, 1963

Edward M. La Combe et al.

It is hereby certified that error appears in the above numbered patent requiring correction and that the said Letters Patent should read as corrected below.

Column 10, in the table, third column, line 3 thereof, for "2.5" read -- 2.0 --; same table, same third column, line 5 thereof, for "5.0" read -- 5.5 --; column 12, line 18, for "XVII" read -- XVIII --.

Signed and sealed this 16th day of June 1964.

(SEAL)
Attest:

ERNEST W. SWIDER                                     EDWARD J. BRENNER
Attesting Officer                                           Commissioner of Patents